United States Patent [19]
Lee

[11] 3,970,558
[45] July 20, 1976

[54] FRYING GREASE RECLAIMER

[76] Inventor: Kai Sing Lee, 1912 Edgemont St., San Diego, Calif. 92102

[22] Filed: Feb. 21, 1974

[21] Appl. No.: 444,641

[52] U.S. Cl. .................................. 210/138; 210/143; 210/167
[51] Int. Cl.² ........................................ B01J 29/36
[58] Field of Search ............. 210/97, 103, 138, 143, 210/167, 168

[56] References Cited
UNITED STATES PATENTS
3,291,562  12/1966  Anderson ......................... 210/167 X
3,701,313  10/1972  Boggs .............................. 210/167 X

*Primary Examiner*—John Adee
*Attorney, Agent, or Firm*—Brown & Martin

[57] ABSTRACT

An automatic fluid filtering system especially designed for reclaiming, deodorizing, decolorizing, and filtering hot frying greases or oil used in restaurants, hamburger stands, fried food industries, homes, and other places and having a means of utilizing wood charcoals, Norite, Salite and various filtering materials such as filter paper, toilet tissues, porous ceramics, etc., to remove food debris, odorous materials and also being very simple in operation and capable of rapidly carrying out the filtration task automatically right in the kitchen working area at any time when fresh clean grease is needed.

5 Claims, 24 Drawing Figures

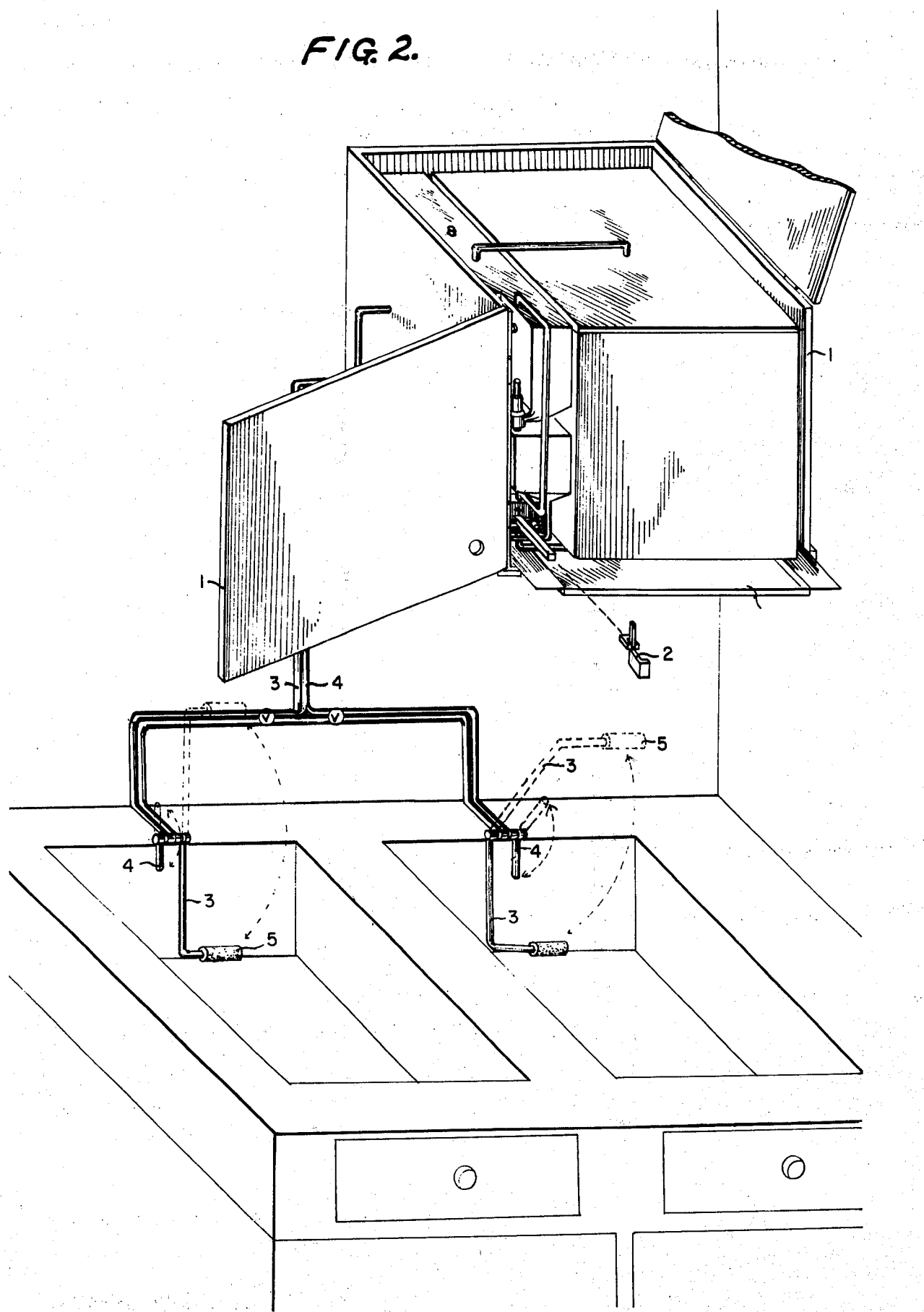

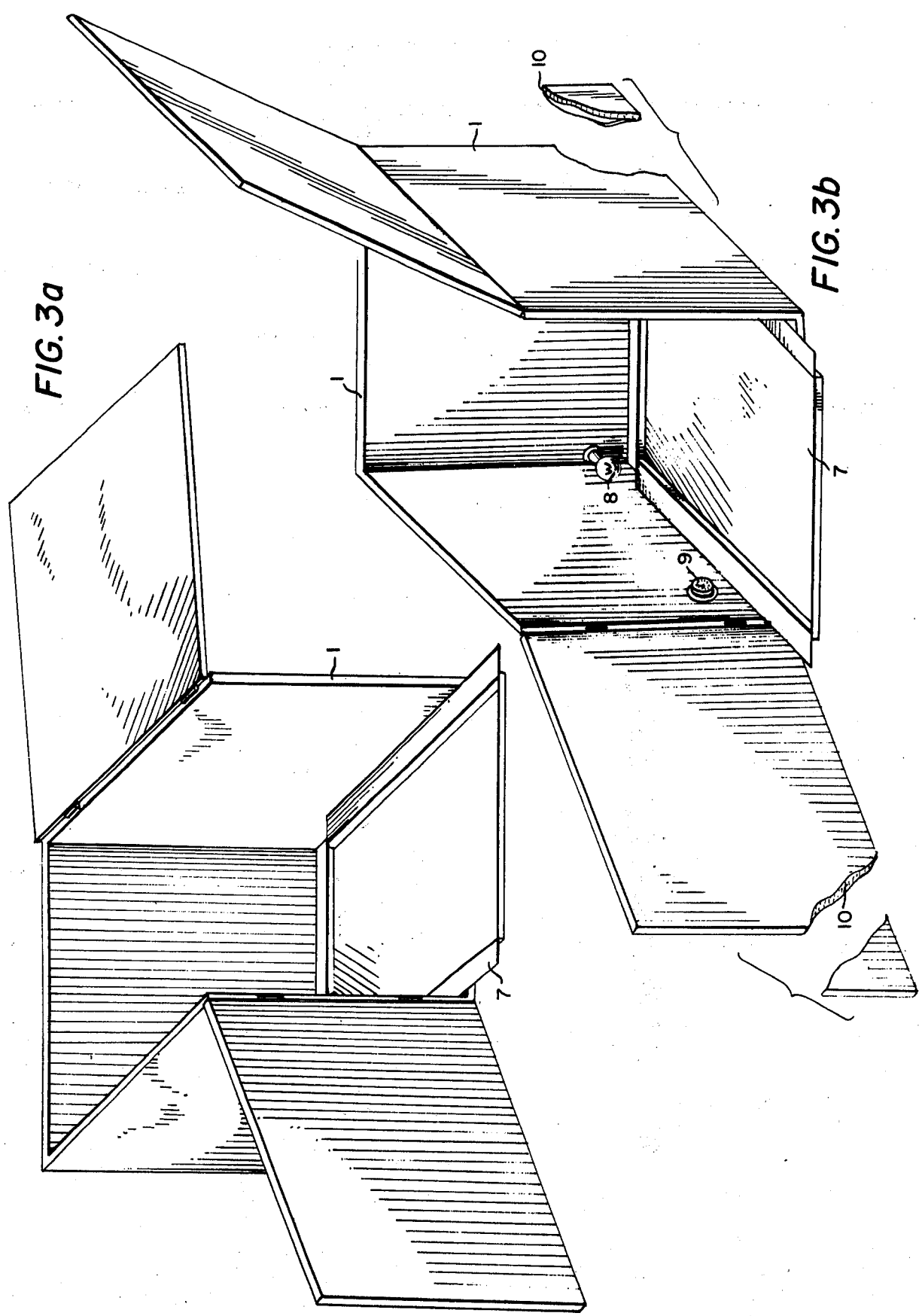

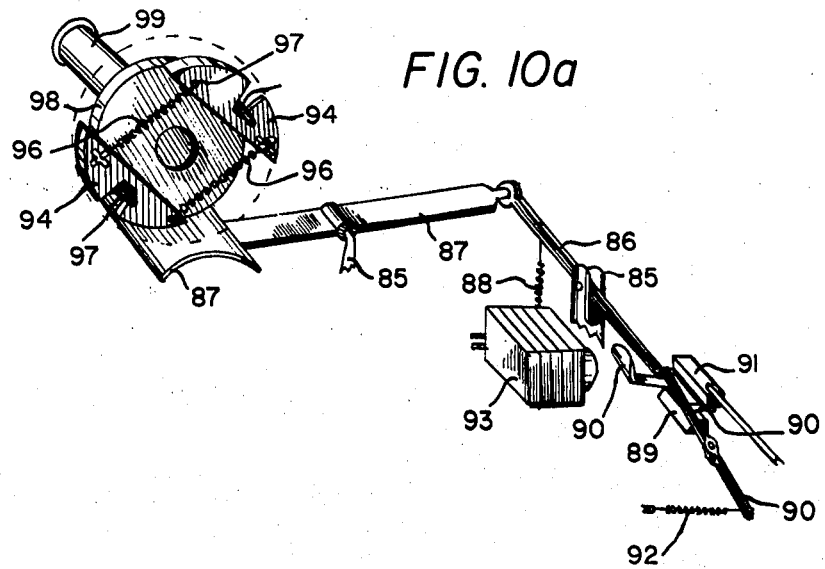
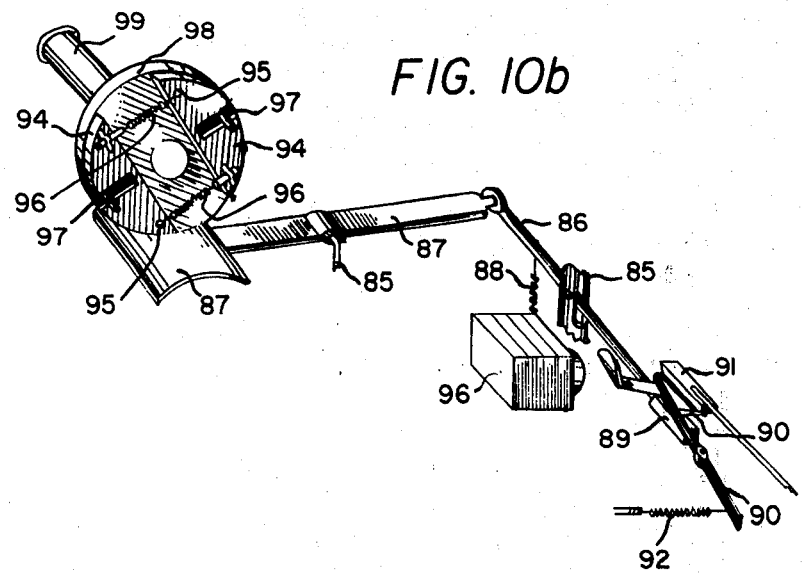

FRYING GREASE RECLAIMER

BRIEF DESCRIPTION OF THE INVENTION

The present invention relates to a fluid filtering device and more particularly to a filtering system for reclaiming and purifying used, odorous grease or oil.

This invention comes in two types, an OVERHEAD HANGING type which can be installed immediately above the frying apparatus in the kitchen, and a GROUND type which can be installed below the frying apparatus. Both types will perform the filtering procedures right away and automatically whenever a need for refreshing the old grease arises.

The entire operation required to initiate either type of the machine to perform a complete filtration process includes two independent steps. The first step of operation is the turning of the dial on the machine clockwise to the IN position. This step initiates the IN cycle of the machine which sucks the used hot grease or oil from the frying apparatus into the machine where it is filtered, processed, and stored. Then the machine shuts off. The next step of operation is the turning of the same dial on the machine anticlockwise to the OUT position. This step initiates the OUT cycle of the machine which starts to deliver the processed filtrate stored in the machine back to the frying apparatus. After the delivery is completed, the machine shuts off again. Therefore a complete filtration process is completed. It is necessary to point out that once the machine has been initiated by either step of the operation mentioned above, the operator can take his mind off the machine completely. The filtration or the delivery procedures that followed are handled by the machine itself including its shut off.

An object of the invention is to provide an efficient and automatically controlled filtering device for regenerating fresh, odor-free grease or oil from debris laden, odorous grease or oil.

Another object of the invention is to provide an automatic filtering system of convenient size immediately accessible to the frying apparatus of various food industries and suitable places so that filtration process can be carried out rapidly at any time right in the kitchen frying area.

Another object of the invention is to provide a very easily operated and maintained filtering device so that during the filtration process, the attention of the operator is not distracted from other matters he is engaged in; also the possible contact with hot grease or oil which is always dangerous to the operator is completely eliminated.

The overall effects of these objects are that:

a. Old grease can be used over and over again, thus the useable frying grease life is much prolonged.

b. Food may be fried in clean frying grease at all times resulting in better tasting and fresh smelling food.

c. A great reduction in expense spent on frying grease is thus made possible.

These together with other objects and advantages which will become apparent reside in the details of construction and operation as will be more fully described and claimed, reference being made to the accompanying drawings forming a part hereof, wherein like numerals refer to like parts throughout and in which:

BRIEF DESCRIPTION OF THE DRAWING

FIGS. 1, 2, 3a and 3b show the cabinet and related structure.

FIGS. 10a and 10b show the disc assembly.

FIG. 1, is an overall view of the invention installed in relation to the frying apparatus below (the unshaded part of the drawing). The machine is contained in a cabinet 1 whose front door bears a dial 6 and a dial turn key 2. A first stage filter 5 guards the intake pipe 3 which together with the exhaust pipe 4 convey the flow to and from the machine. The terminals of both pipes 3 and 4 can be lifted out of the fryer as shown in the diagram. The valves provide choices between fryers.

FIG. 2, shows the front and upper doors of the cabinet 1 open, revealing the automatic pumping system at left, the filtering storage tank system at right and the oil drip pan 7 at bottom. The dial turn key 2 is shown detached from the automatic pumping system.

FIGS. 3a and 3b, contains two different views of the double walled cabinet 1 which is insulated by glass wool 10 between the inner and outer walls. The cabinet 1 and all the rest of the machine except the filtering elements are made of stainless steel or other suitable metals or materials. The electric heating device 8 and the thermostat 9 which together regulate and maintain a constant temperature inside the cabinet 1 can be seen in the FIGURE.

FIGS. 4a and 4b, reveals the automatic pumping system at left and the filtering storage tank system at right when the front door and the left wall of the cabinet 1 are removed. The lower diagram shows the automatic pumping system removed from the cabinet 1 with the filtering storage tank system remaining in the cabinet 1.

FIG. 5, is an enlarged view of the automatic pumping system at left, the filtering storage tank system at right, the upper pipe 11 and the lower pipe 12 together link up the flow of the automatic pumping system to and from the filtering storage tank system. The fluid flow directions are indicated by arrows. The solid arrows represent the inflow path of the used hot grease or oil, the broken arrows represent the outflow path of the processed clean filtrate (please also refer to the flow diagram of FIG. 19).

FIG. 6, is a separation of the automatic pumping system into various units. The system consists of three interconnected units, namely, the 2-tank unit for refilling and thus providing the pressure fluid pump 100 with siphonic suction power in order to draw fluid against gravity from the frying apparatus at below, and the 6-way-valve unit 29, 59 and 48 which directs both the fluid flow path to and from the filtering storage system and the operation of a motor on and off control unit (64 or 74, 85, 98).

Figure 6:
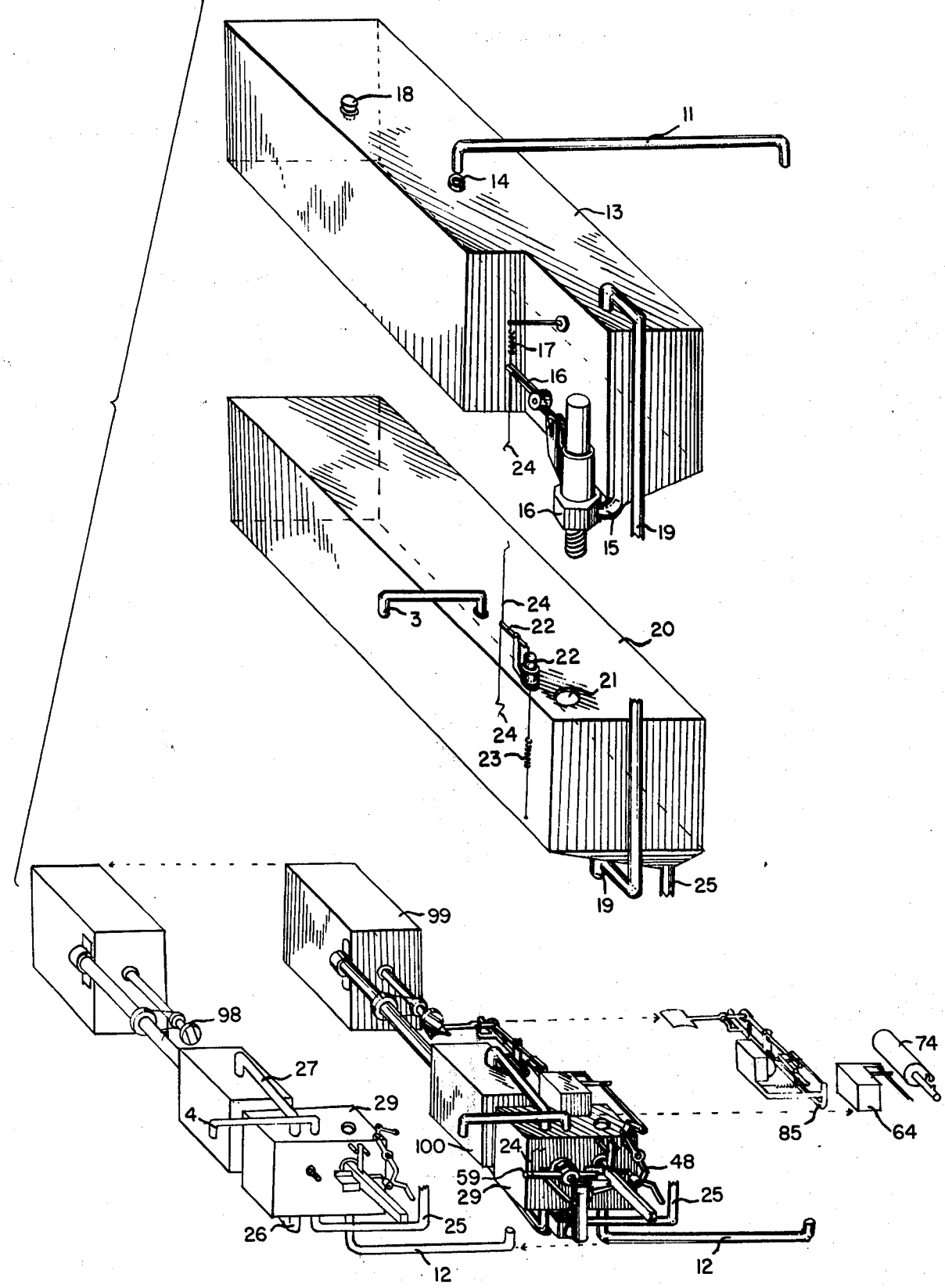
Figure 7:
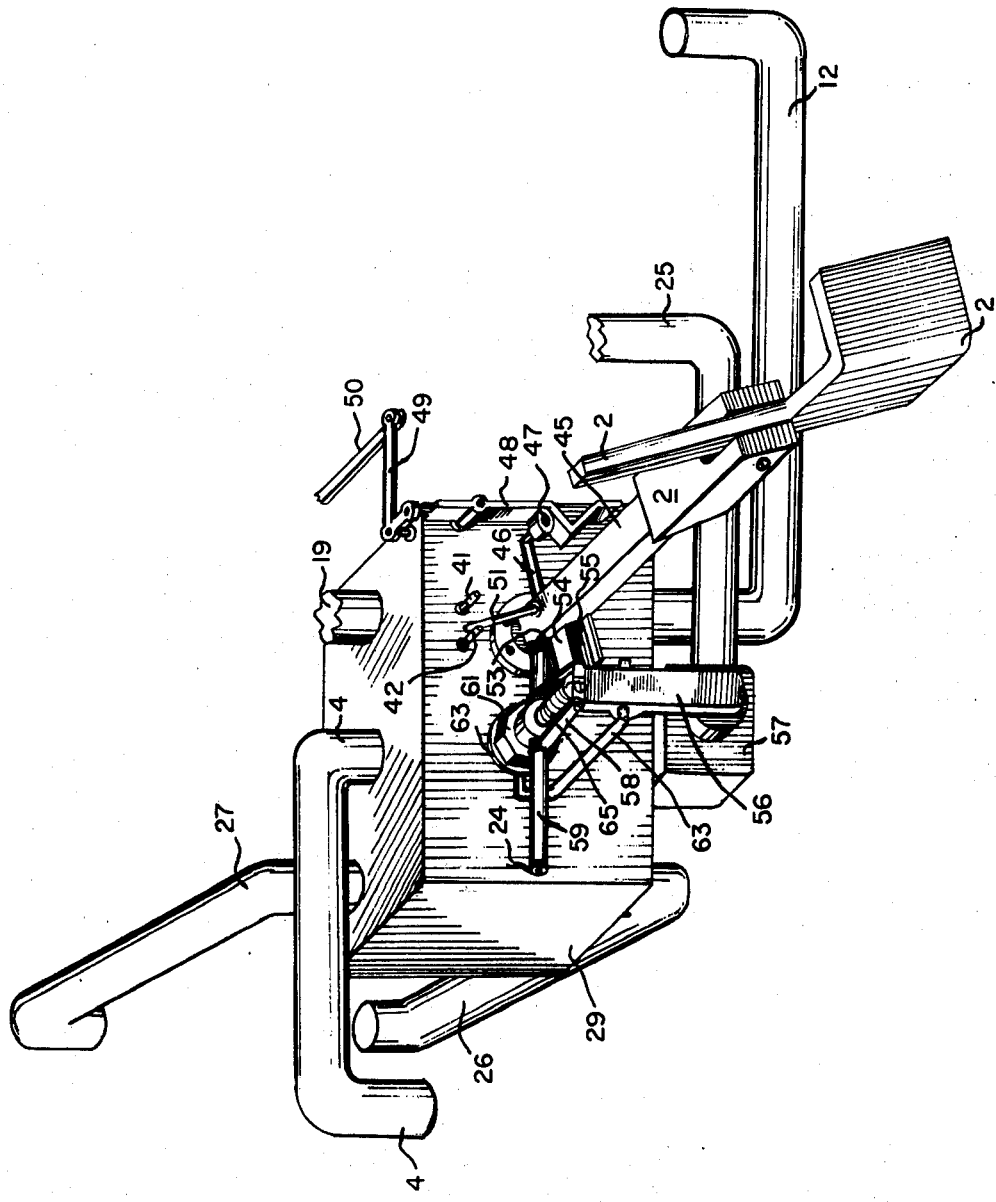
FIGS. 7 and 8 show the valve unit.
Figure 8:
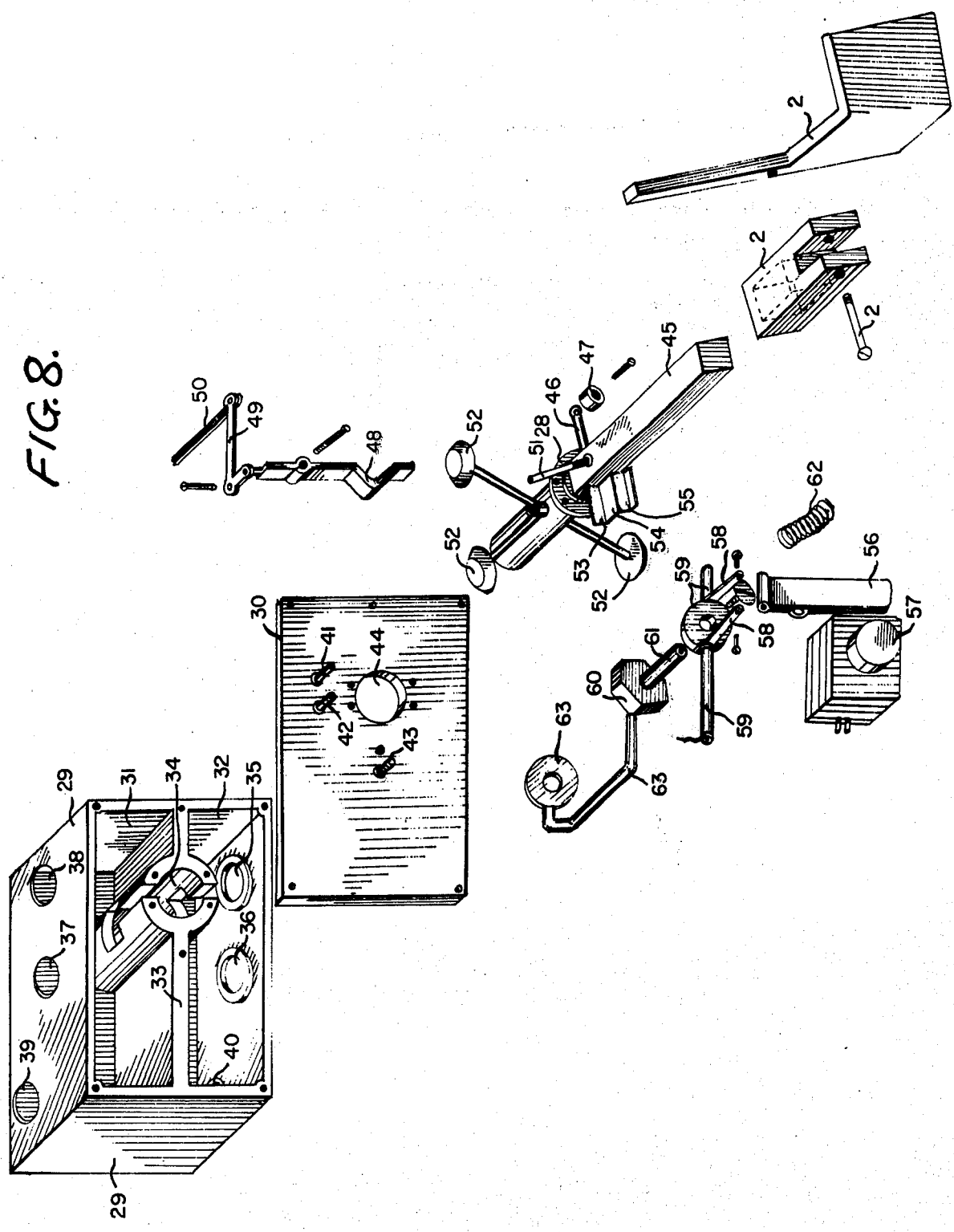

The 2-tank unit consists of a reservoir tank 13 which receives pipe 19 from the valve 38 of the 6-way-valve 29 of FIGS. 8 and 19. The reservoir tank 13 also has an outlet 14 which is linked with the inlet 104 of the filtering storage tank system of FIG. 11 by pipe 11. A connecting valve 16 joins the reservoir tank 13 to the regulator tank 20 at below by way of the outlet 15 and the inlet 21 of each tank respectively. The regulator tank 20 which receives the intake pipe 3 of the machine has an air valve 22 and an outlet pipe 25 which runs to the valve 36 of the 6-way-valve 29 of FIG. 8. Both the connecting valve 16 and the air valve 22 are kept closed by the pull of the extension springs 17 and 23 respectively. When enough downward counter pull is exerted along the valve line 24, both the connecting valve 16 and the air valve 22 will be opened in synchrony, allowing fluid to flow from the reservoir tank 13 into the regulator tank 20 under gravity. The other two units shown at the bottom of FIG. 6 are described more fully in the following FIGURES:

FIGS. 7 and 8, show the 6-way-valve unit (29, 59, 48). This unit consists of a 6-way-valve 29 and two lever systems. One of the lever systems consists of a connecting bar 50 which is articulated at a right angle with a "L" lever 49 joined to another lever 48. The lever 48 has a hump at its free end. The hump of the lever 48 is pressed against a roller 47 whose arm 46 is fixed to the valve stem 45 of the 6-way-valve 29. This lever system operates the time delay switch 64 or 74. The other lever system of the unit consists of a staircase socket 53, 54 and 55 fixed to the valve stem 45. The staircase socket has two steps, a lower step 53 and an upper step 55. Associated with the staircase socket is the rest of this lever system consisting of a coil magnet 57, which when energized, pulls the tail of a lifting lever 56 towards it. The lifting lever 56 pivots on the arm of a supporting plate 63. This lever system also consists of a horizontal lever 59 whose right arm lies in the staircase socket and its left arm connects to the valve line 24, two connecting bars 58 joining the horizontal lever 59 to the head of the lifting lever 56, and a compression spring 62 fitting around the central shaft 61 of the base plate 60 to compress the horizontal lever 59 against the base plate 60. The base plate 60 with the rest of this lever system is fixed onto a stationary screw 43 of the cover plate 30 of the 6-way-valve 29. The valve stem 45 fits through the hole 44 of the coverplate 30 into the socket 34 of the center wall 33 which separates the 6-way-valve 29 into two separated chambers, namely, the incoming chamber 32 and the outgoing chamber 31. Inside the 6-way-valve 29 there are four valve stoppers 52 arranged around the valve stem 45 in an "X" fashion and each guards one of the valves 35, 36, 37, and 38 of the 6-way-valve 29 in such a way that as the valve stem 45 is turned either clockwise or anticlockwise, the two valves diagonally opposite to each other are either both closed or opened. Therefore, a desired path of fluid flow of FIGS. 5 and 19 can be selected. The other two unguarded openings 39 and 40 of the 6-way-valve 29 link up the incoming chamber 32 and the outgoing chamber 31 with the pressure fluid pump 100 so that the fluid can be driven from the incoming chamber 32 through the pressure pump 100 into the outgoing chamber 31 of the 6-way-valve 29. A washer 28 seals up the hole 44 in the cover plate 30.

Figure 9:
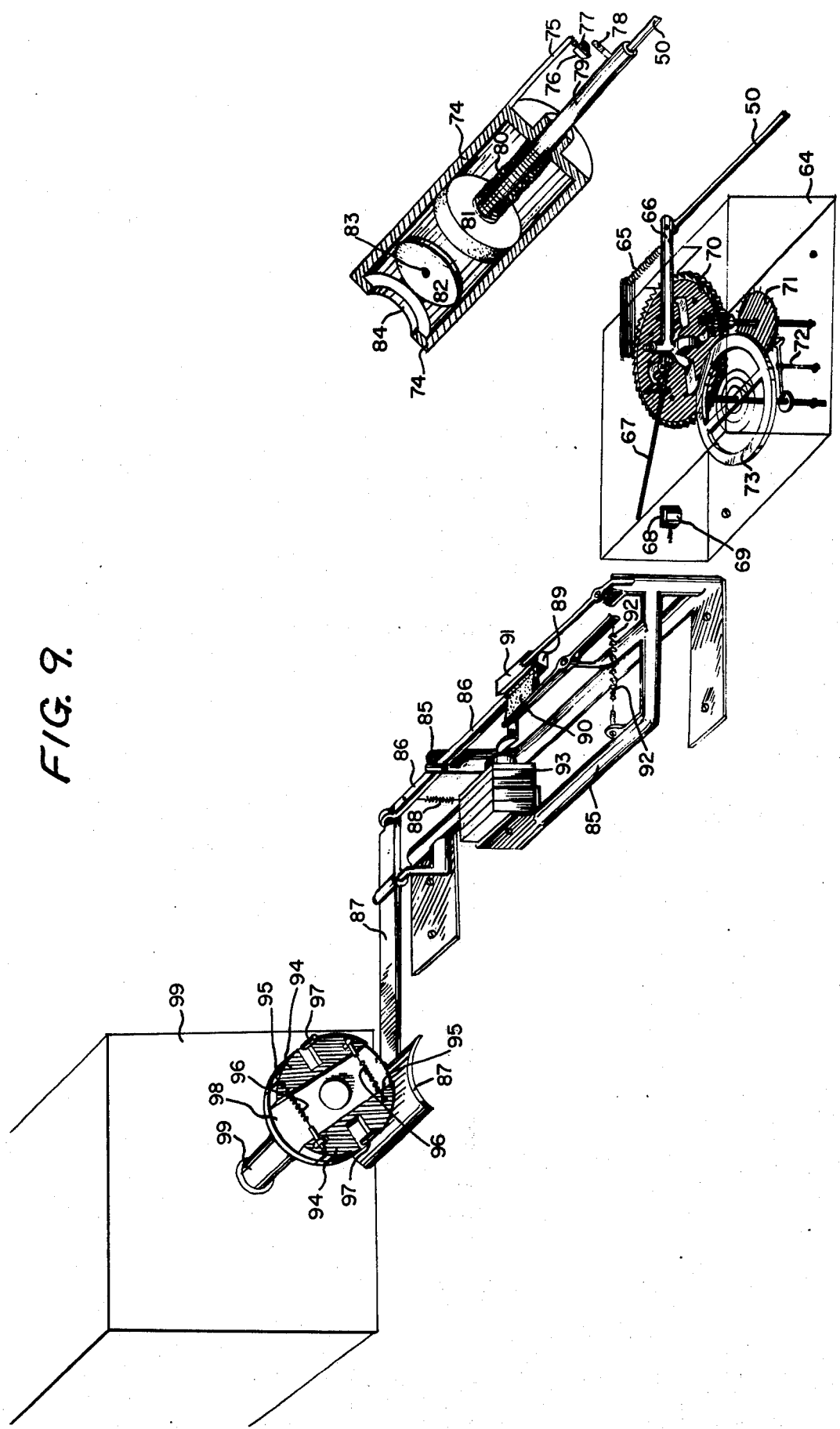
FIG. 9 show the motor control unit.

FIG. 9, reveals the motor on and off control unit. This unit consists of three subunits, namely, the centripetal disc assembly 98, the centripetal switch assembly 85 and the time delay switch assembly of either the clock type 64 or the air pump type 74.

The centripetal disc assembly consists of two weights 94 mounted on a base plate 98 at points 95. The weights 94 are kept within the circumference of the base plate 98 by the extension springs 96 during moderate rotational speed of the centripetal disc assembly. As the rotational speed of the centripetal disc assembly increases, the centripetal force generated on the weights overcomes the pull of the extension spring 96. As a result, the weights are thrown outwards, and the diameter of the disc 98 is increased. Two checkers 97 are provided on the base plate for limiting the amount of outward movement of the weights 94 during acceleration (please refer to the upper diagram of FIG. 10). The centripetal disc assembly is mounted on the drive shaft of the motor 99.

The centripetal switch assembly consists of a number of parts mounted on a frame 85. The main component of the centripetal switch assembly is the switch contact plate lever 86 which is pivoted on the frame 85. One end of this lever articulates at right angle with a switch opening lever 87 and an extension spring 88. The other end of the switch contact plate lever 86 bears a switch contact plate 89 which faces directly with a stationary switch contact plate 91 at above. An extension spring 92 drives the front edge of an insulating plate 90 to press constantly at the contact surfaces of the two switch contact plates 89 and 91. A coil magnet 93 is located immediately behind the insulating plate 90. All these parts are arranged in such a way that during the centripetal disc assembly acceleration, the sudden increase in diameter of the centripetal disc 98 depresses the broad end of the switch opening lever 87 so that the end of the switch contact plate lever 86 joining to the switch opening lever 87 is raised against the downward pull of the extension spring 88. As a result, the switch contact plate 89 is lowered accordingly. A gap is formed between the switch contact plates 89 and 91, the extension spring 92 drives the insulating plate 90 into the gap thus separating the two switch contact plates 89 and 91, and the motor 99 stops (please refer to the wiring diagram of FIG. 19). To restart the motor 99, the coil magnet 93 is energized and the insulating plate 90 is drawn out from between the switch contact plates 89 and 91 enabling the extension spring 88 to bring the switch contact plate 89 into direct contact with the facing switch contact plate 91. Thus the motor starts to run again.

The time delay switch is self-resetting and comes in two types, an air pump type and a clock type.

The air pump type consists of a cylinder 74 with an arm 75. The arm 75 bears a stationary switch contact plate 77 and an insulating plate 76 fused together back to back. The other switch contact plate 78 is attached to the central shaft 79 of a piston 81 inside the cylinder 74. The central shaft 79 is connected to the connecting bar 50. Every time pulling force is exerted on the central shaft 79 of the piston 81, the piston 81 is drawn away from the valve 84 which opens only to the inside of the cylinder 74 thus allowing air rushes rapidly in. In the meantime, the compression spring 80 is compressed, the switch contact plate 78 passes across the insulating plate 76. As the central shaft 79 of the piston 81 is released from the pull, the compression spring 80 exerts full force on the piston 81 which is now being pushed towards the valve 84. Consequently, the valve 84 is closed by the valve stopper 82. The downward travel of the piston 81 towards the valve 84 brings the switch contact plates 78 and 77 closer and closer to each other until they touch. The downward travel speed of the piston 81 depends on the diameter of the air hole 83 in the valve stopper 82 and the strength of the compression spring 80 and thus determines the amount of time delayed before the switch contact plates 78 and 77 touch.

The clock type consists of an ordinary clock assembly with timing gears 71, 72, 73, etc. geared to a ratchet and shaft 70. The shaft 70 is fixed to a step-up winding bar 66. The short arm of the step-up winding bar 66 is associated with a switch contact plate lever 67 which can make momentary contact with a stationary switch contact plate 69. This stationary switch contact plate 69 is also fused to an insulating plate 68 back to back. The long arm of the step-up winding bar 66 is attached at ninety degrees to a connecting bar 50 and an extension spring 65. When the long arm of the step-up winding bar 66 is pulled forward in a clockwise direction, the extension spring 65 is stretched. Meanwhile, the short arm of the step-up winding bar 66 moves clockwise causing the switch contact plate lever 67 to swing forward in an anticlockwise direction and to pass across the insulating plate 68. As the long arm of the step-up arm 66 is released from the pull, the extension spring 65 pulls the long arm 66 anticlockwise toward it, thus setting the timing gears in motion. The switch contact plate lever 67 thus starts to travel slowly backward in a clockwise direction back to its original starting position. At a certain point along the clockwise path of the switch contact plate lever 67, the switch contact plates 67 and 69 touch. The amount of time needed to bring the switch contact plates 67 and 69 to contact is therefore the amount of time delayed and is dependent upon the strength of the extension spring 65 and the number of timing gears involved.

FIGS. 10a and 10b, shows the centripetal disc assembly during and after acceleration. During acceleration, the weights 94 are thrown outwards, the switch contact plates 89 and 91 are opened, the insulating plate 90 is driven into the gap by the extension spring 92. After acceleration, the centripetal weights 94 are retracted back to their original position by the extension springs 96.

Figure 11:
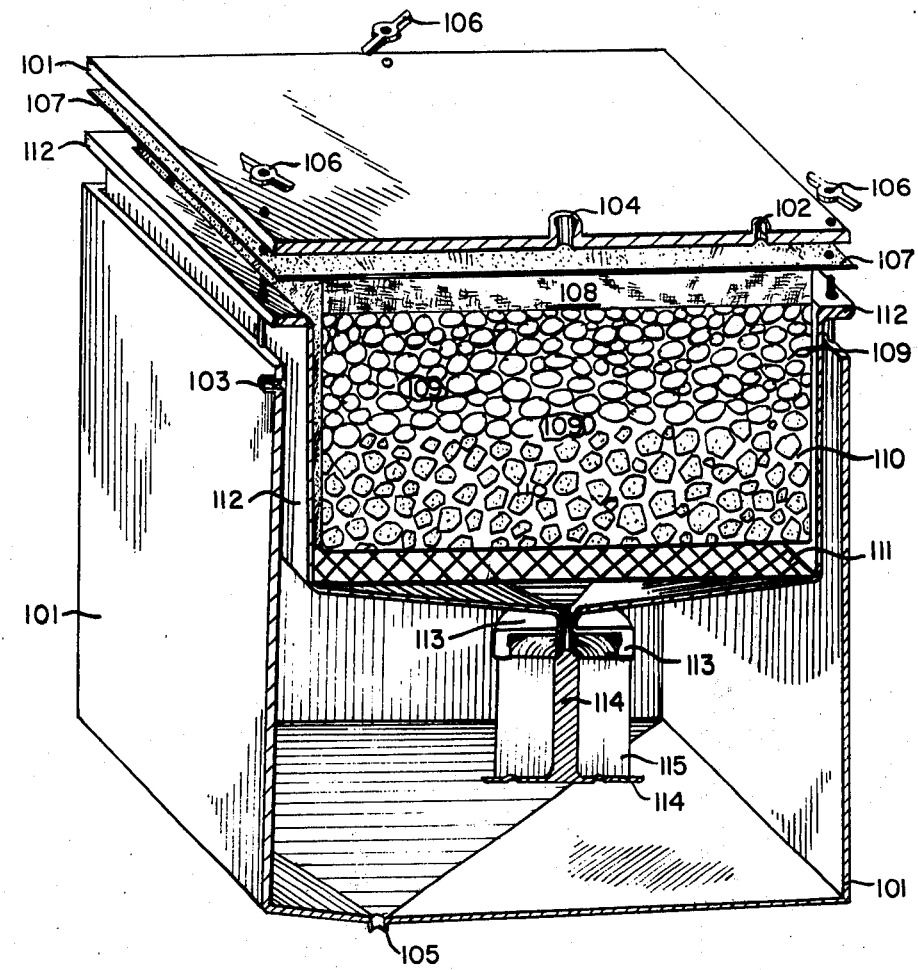
FIGS. 11, 12, 13a, 13b and 14 show the filter storage tank system.
Figure 12:
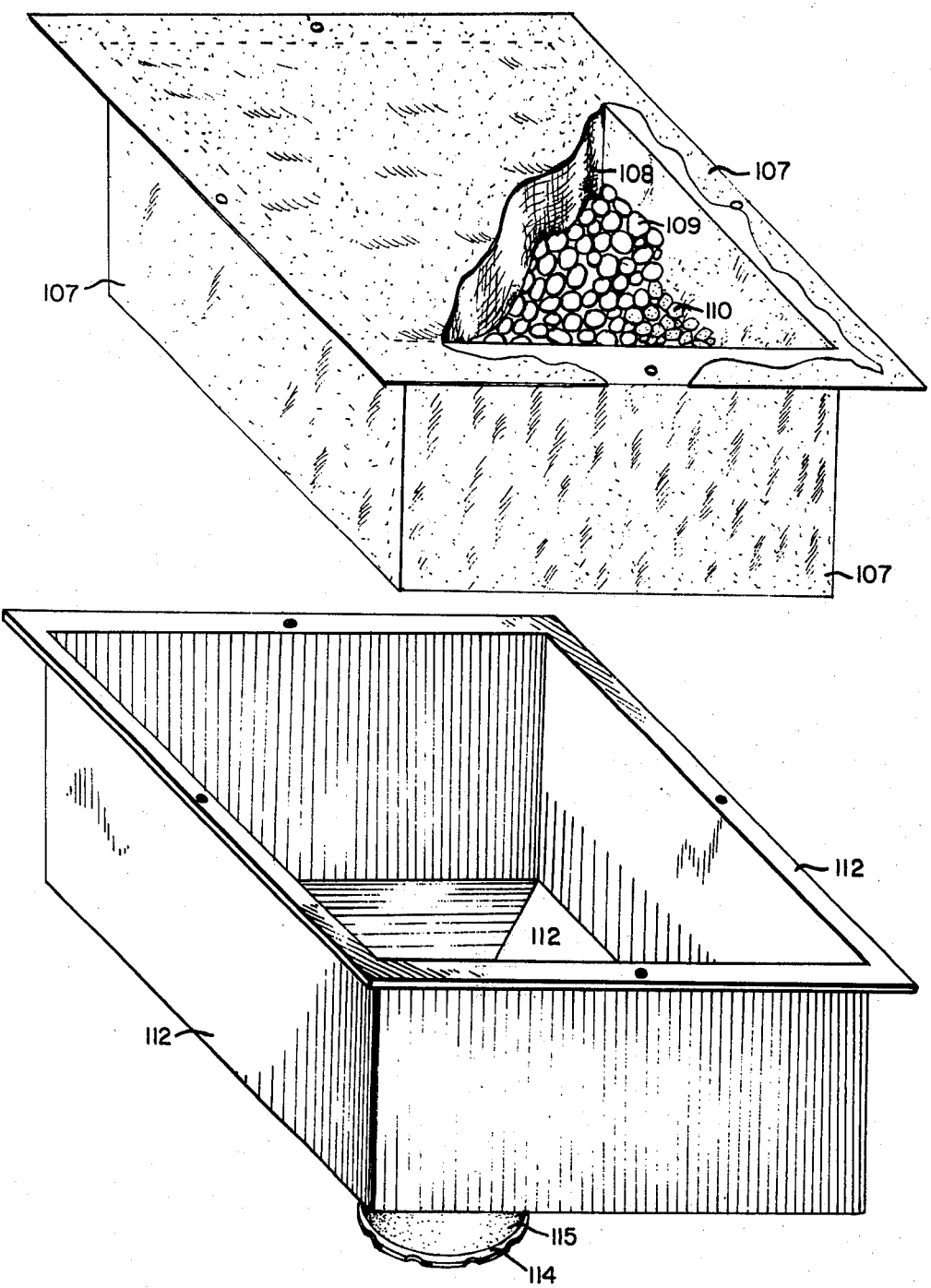
Figure 13A:
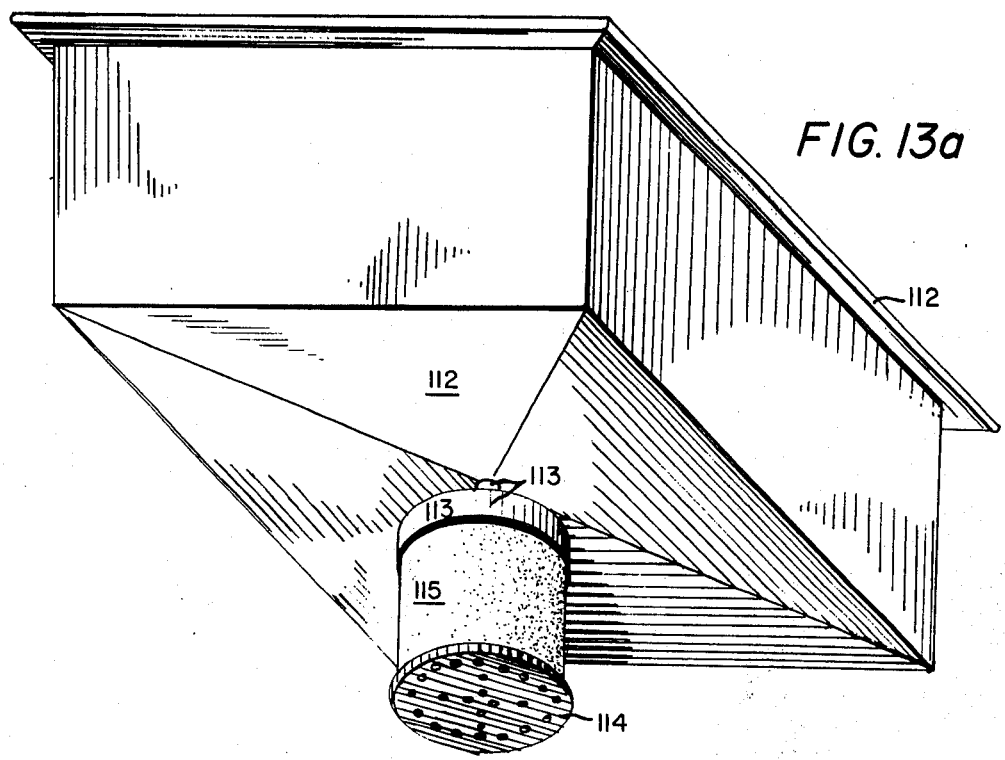
Figure 13B:
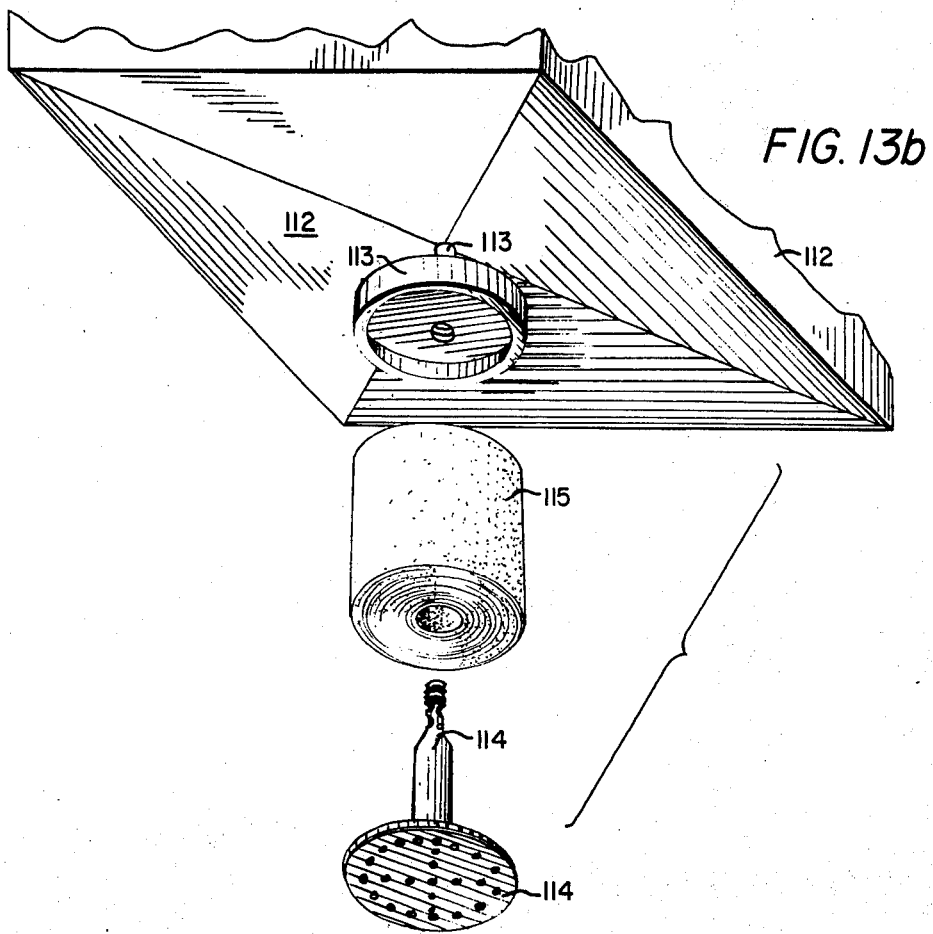
Figure 14:
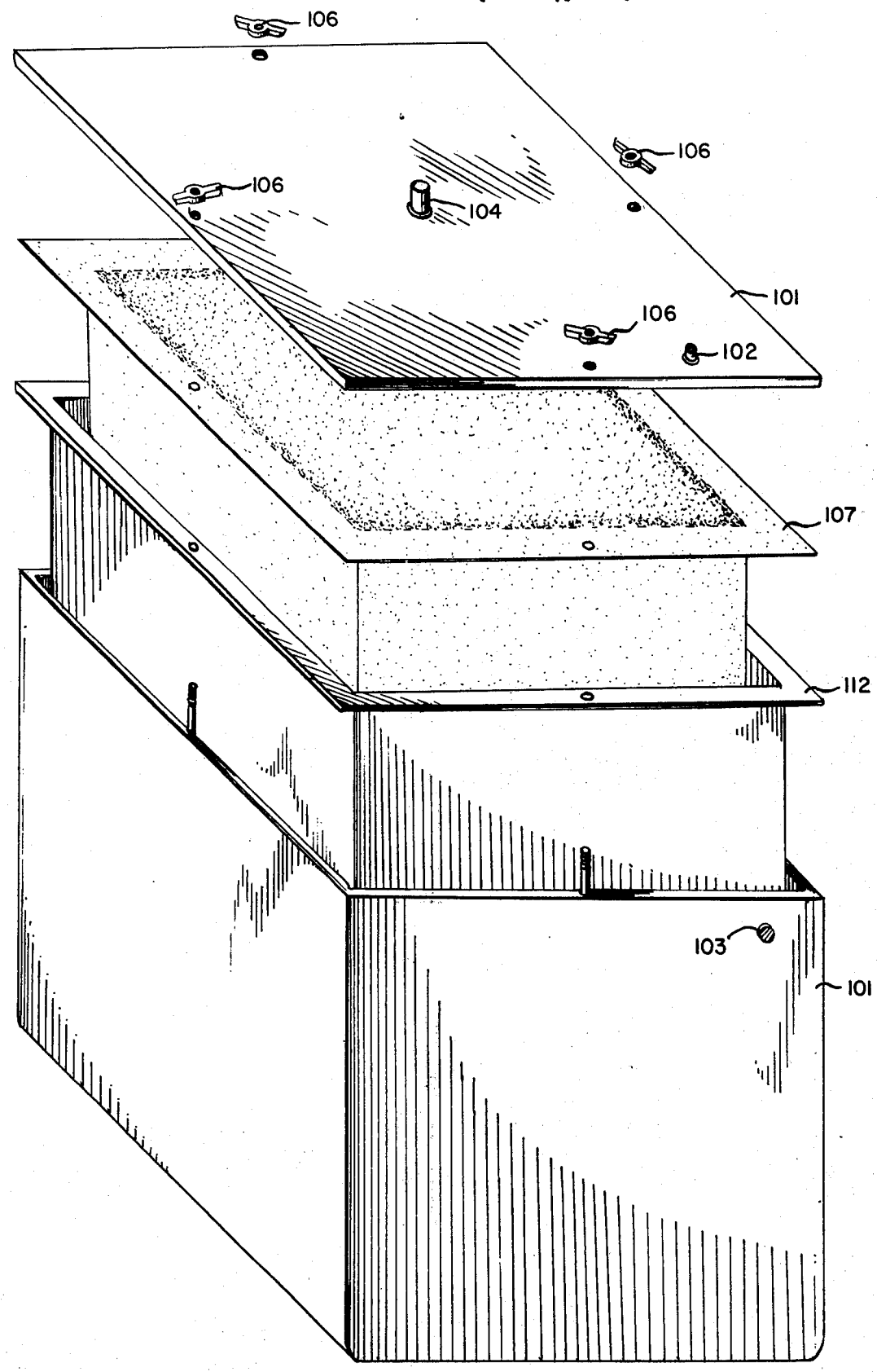

FIG. 11, shows the cross section of the filtering storage tank system. The system consists of a large storage tank 101 with a cover lid, two air valves 102 and 103, an inlet 104, outlet 105, and locknuts 106. Inside the storage tank 101 is the filter bag 107 (the second stage filter) which is filled with layers of fine tissue or fibrous filtering elements 108, Norite or wood charcoal 109, Salite and decolorizing agent 110. The filter bag 107 with its contents rests upon a supporting screen 111 in a shallow trough 112 of FIGS. 11, 12, 13a and 13b, and 14. The outlet pipe 113 of the shallow trough 112 expends and forms the filter cap of the last stage filter (third stage filter) which is attached to the filter cap 113 at the bottom of the shallow trough 112. The last stage filter contains a roll of filter paper (or toilet tissue roll) 115, a porous metal base plate 114 whose central shaft is porous and hollow near the free end and fits through to plug up the hollow center of the tissue roll into the hole of the filter cap 113 to hold the toilet tissue roll tight up against the filter cap 113. The shallow trough 112 with the filter bag 107 and the last stage filter 113, 114 and 115 are locked and sealed into the storage tank 101 by the lock nuts 106 on the cover lid so that the fluid will be driven through the inlet hole 104 into the large storage tank 101. Once in the storage tank 101, the fluid will be drawn into the filter bag 107, passing through the layers of filtering, odor and color absorbing elements of layers 108, 109, 110 containing in the filter bag 107. Then the fluid is collected at the base of the shallow trough 112 to be drawn through in between the layers of tissue of the toilet roll 115 and then out through the porous base plate 114. The clean filtrate is collected and stored at the spacious bottom of the storage tank 101. The second stage filter (107, 108, 109, 110) and the toilet tissue roll 115 of the third stage filter can easily be replaced by new ones. To replace the second stage filter, the shallow trough 112 is lifted out of the storage tank 101, then it is inverted to dump the filter bag 107 inside. The toilet tissue roll 115 can also be replaced by unscrewing the base plate 114 from the filter cap 113. The first stage 5 filter is made of porous ceramic or other suitable materials that is noncombustible, odor and debris free. The first stage 5 filter can be reused after being washed by water.

Figure 15:
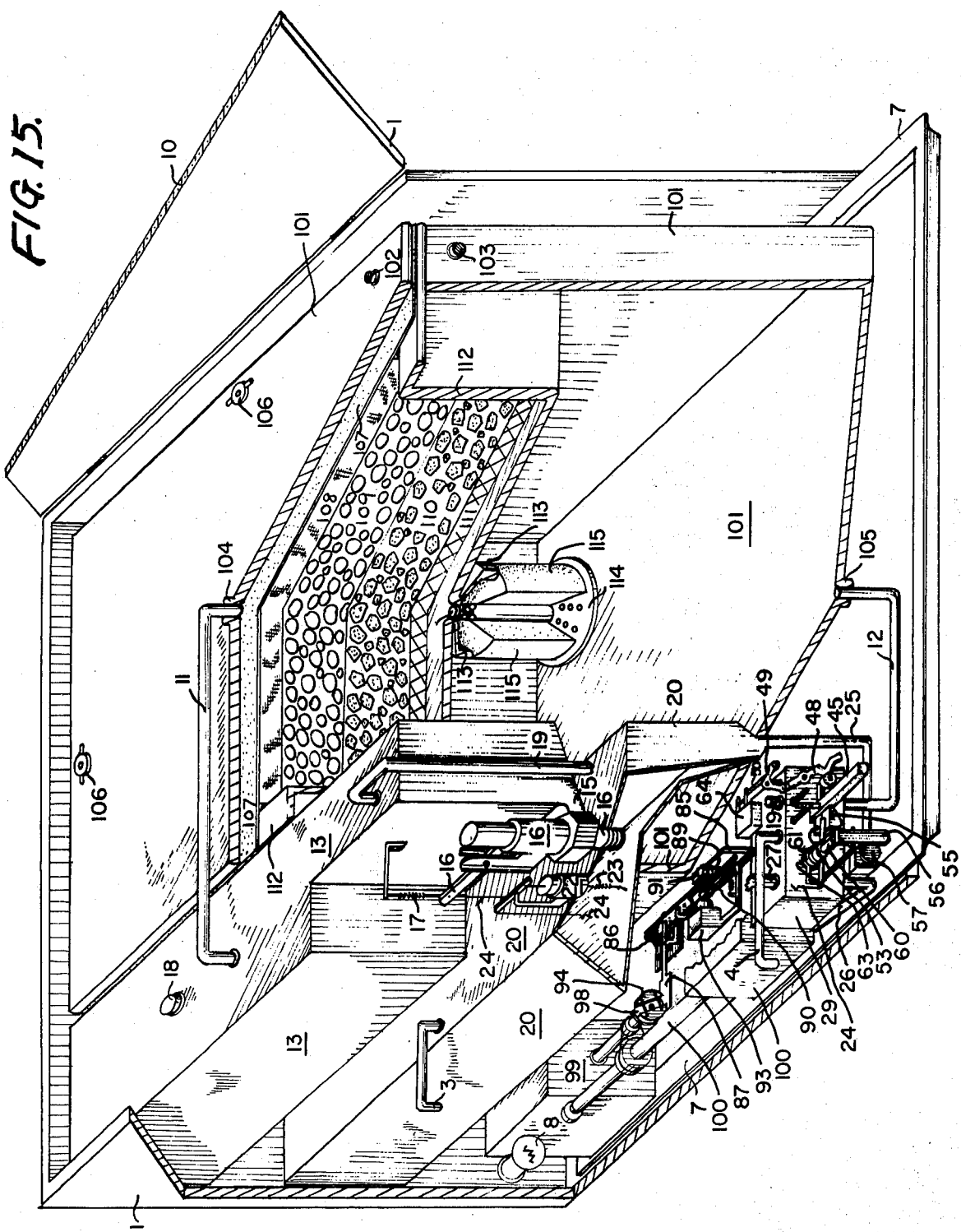
FIGS. 15, 16 and 18 are sectional views of the machine.

FIG. 15, is a sectional view of the OVERHEAD HANGING type of the machine revealing every part installed in its normal position.

Figure 16:
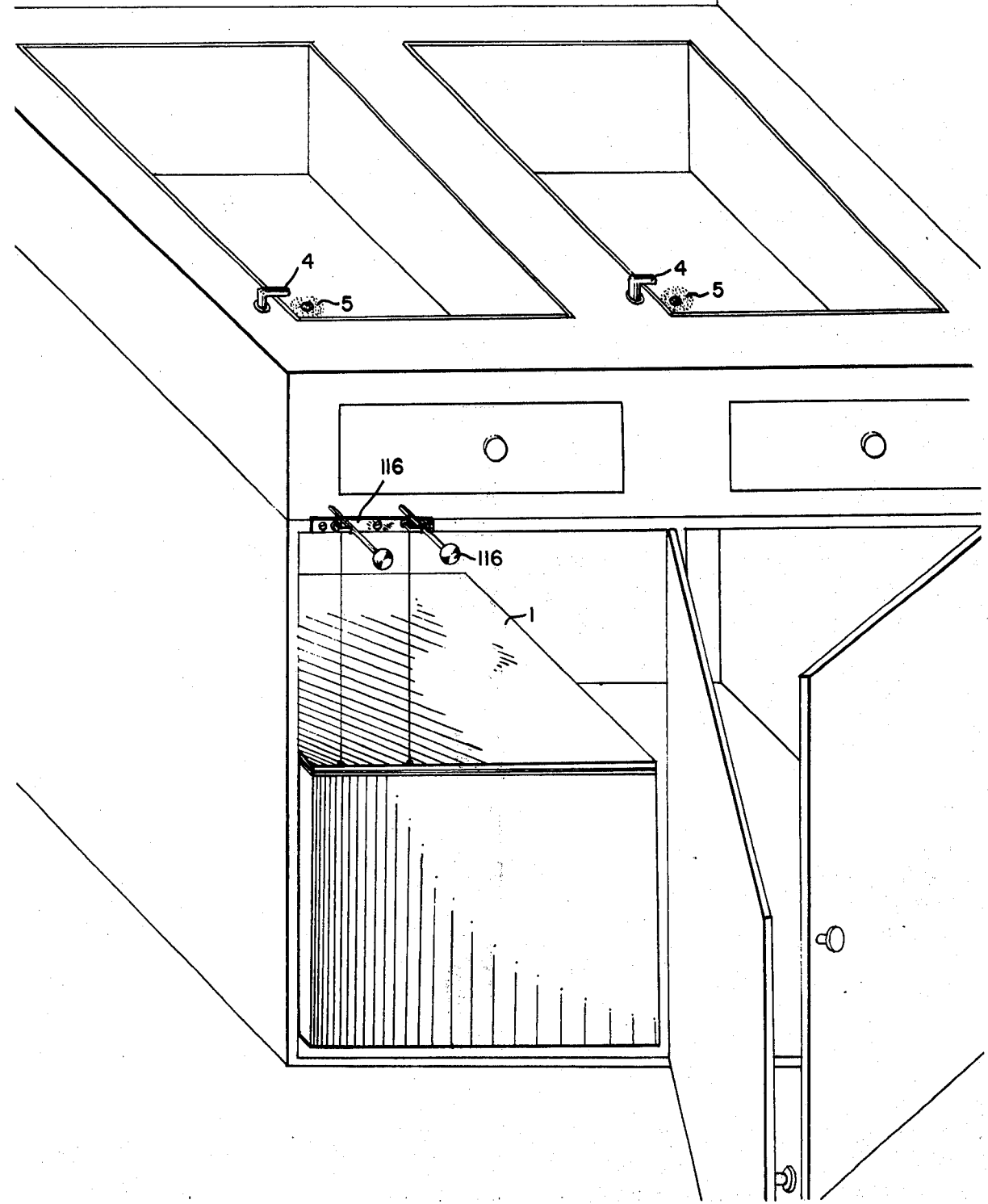

FIG. 16, is the overall view of the GROUND type of the machine. This type can be stored in the cabinet underneath the frying apparatus (the unshaded part). The dial turn key 2 of FIG. 2 in this case can be extended by a handle pushing device 116 to a convenient place for operation.

Figure 17:
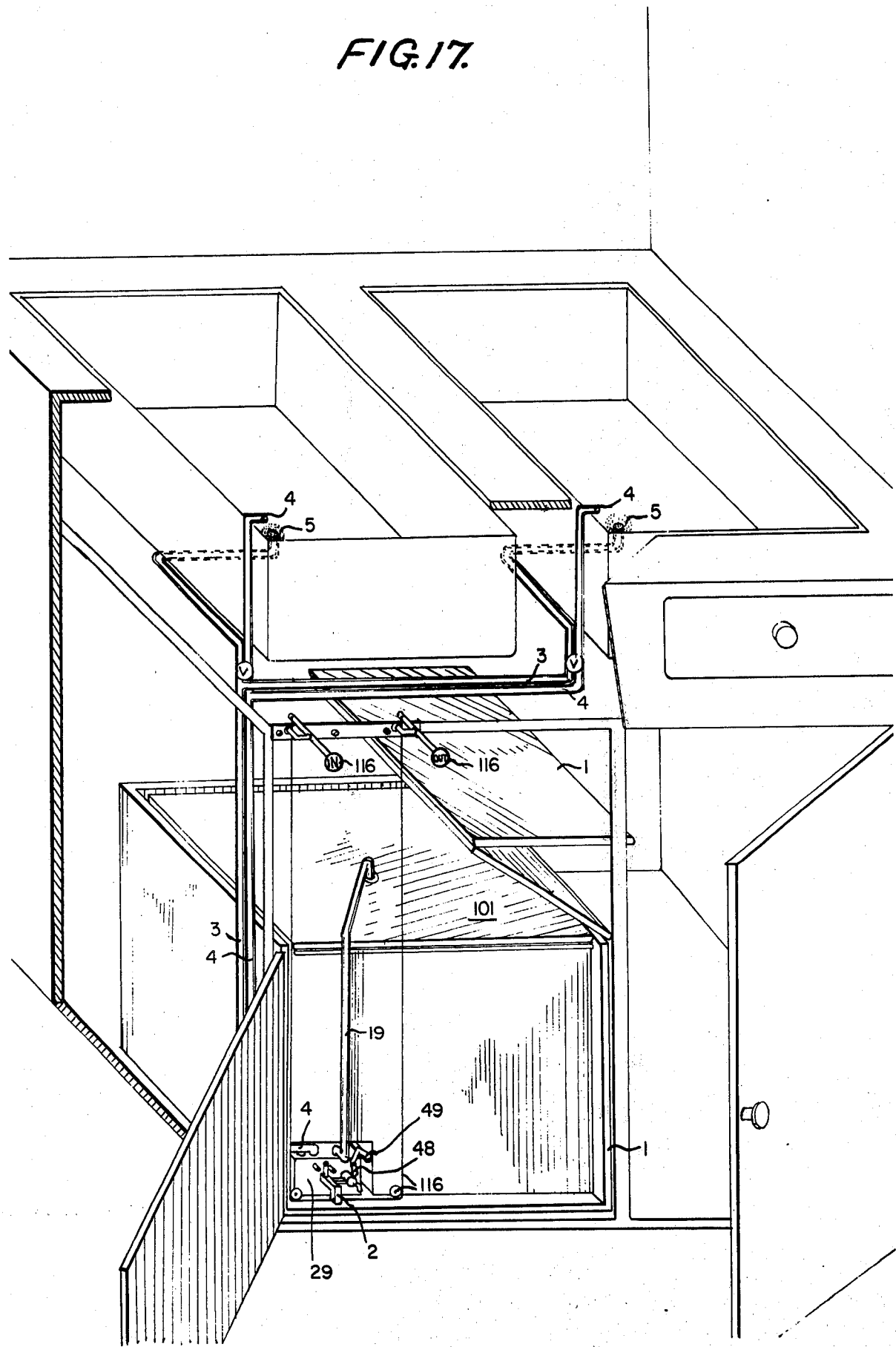
FIG. 17 show part of the frying apparatus

FIG. 17, shows part of the frying apparatus (the unshaded part) being sectioned, revealing the possible arrangement of the pipes 3 and 4 to and from the machine of the GROUND type.

Figure 18:
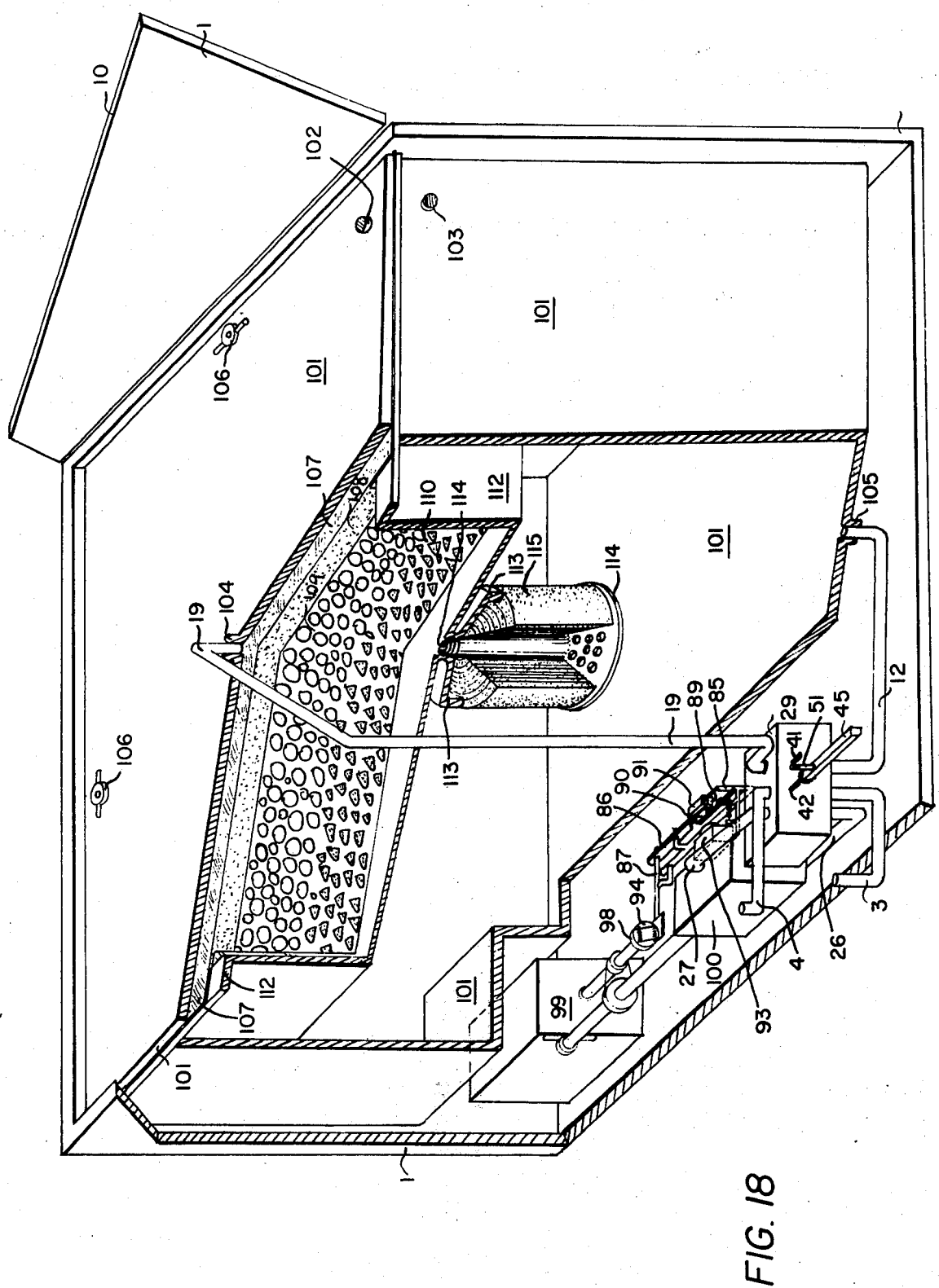

FIG. 18, is the sectional view of the GROUND type with every part installed in place. In this type we notice that the regulator tank 20, the reservoir tank 13, the time delay switch of either type 64 or 74, the connecting valve 16, and the two lever systems 59 and 48 that are found in the OVERHEAD HANGING type are absent in this type. Other parts are exactly the same except the storage tank 101 is larger.

Figure 19A:
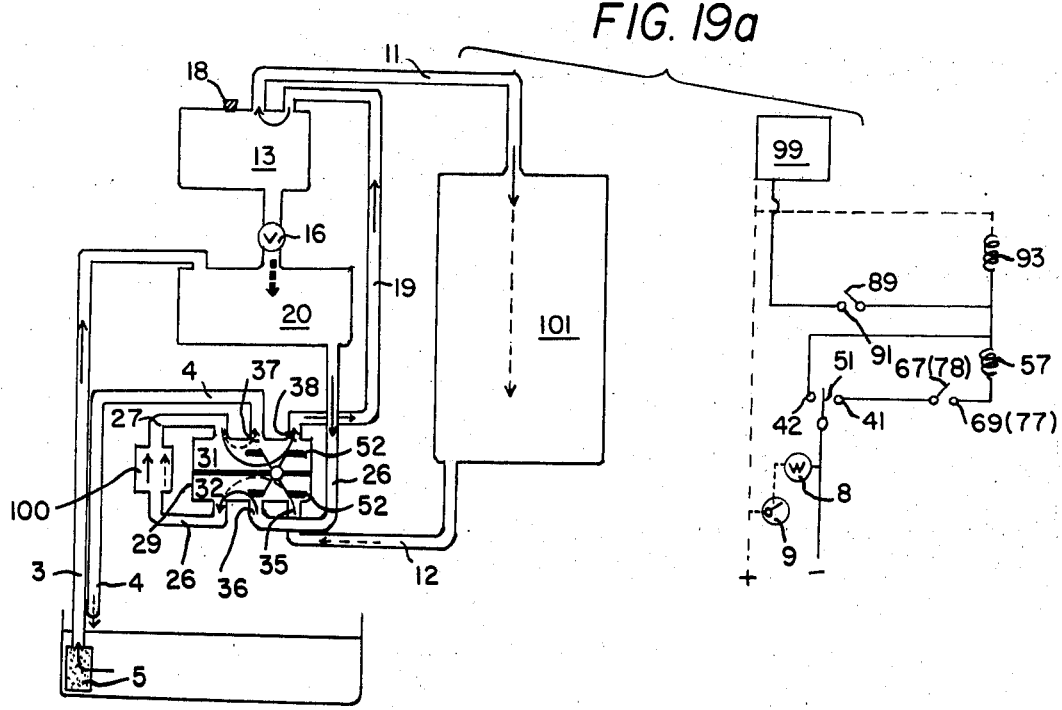
FIGS. 19a and 19b are flow and mixing diagrams for the machine.
Figure 19B:
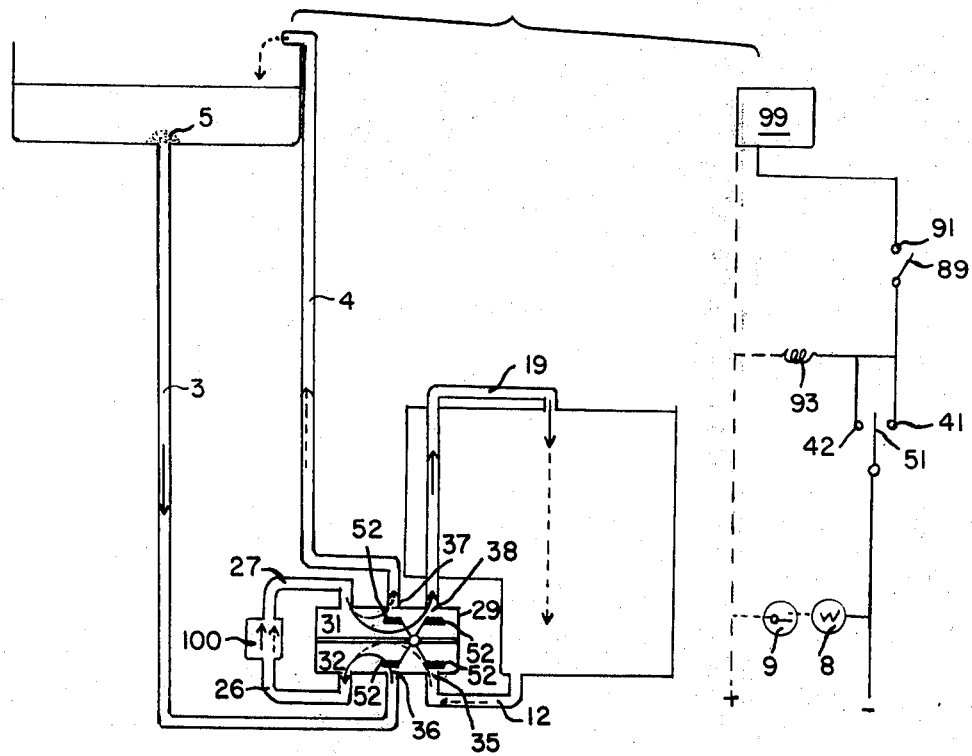

FIGS. 19a and 19b, provides a grease flow diagram and a wiring diagram for both types of the machine. The upper diagrams being the OVERHEAD HANGING type and the lower diagrams being the GROUND type.

OPERATIONS AND WORKING PRINCIPLES

A. The Overhead Hanging Type

The actions of the filtration process are all triggered by the movements of the valve stem (45) of the 6-way-valve (29) of FIGS. 7 and 8.

a. The IN Cycle Operation

This cycle is for transferring the used hot grease from the frying apparatus into the machine where it is purified and stored. However, to transfer dirty hot grease against gravity into the machine from the frying apparatus at below requires that the pressure fluid pump 100 to be filled with fluid. To fulfill this requirement, the 2-tank unit and the time delay switch are put into use. The reservoir tank 13 serves as a permanent fluid storage area for refilling the pressure fluid pump 100 on demand while the regulator tank 20 serves as a regulator reservoir so that the pressure fluid pump 100 will not run out of fluid before the fluid from the frying apparatus can be actually drawn into the pressure fluid pump 100. The volume of the 2-tank unit is directly proportional to the length and cross sectional area of the intake pipe 3.

Figure 1:
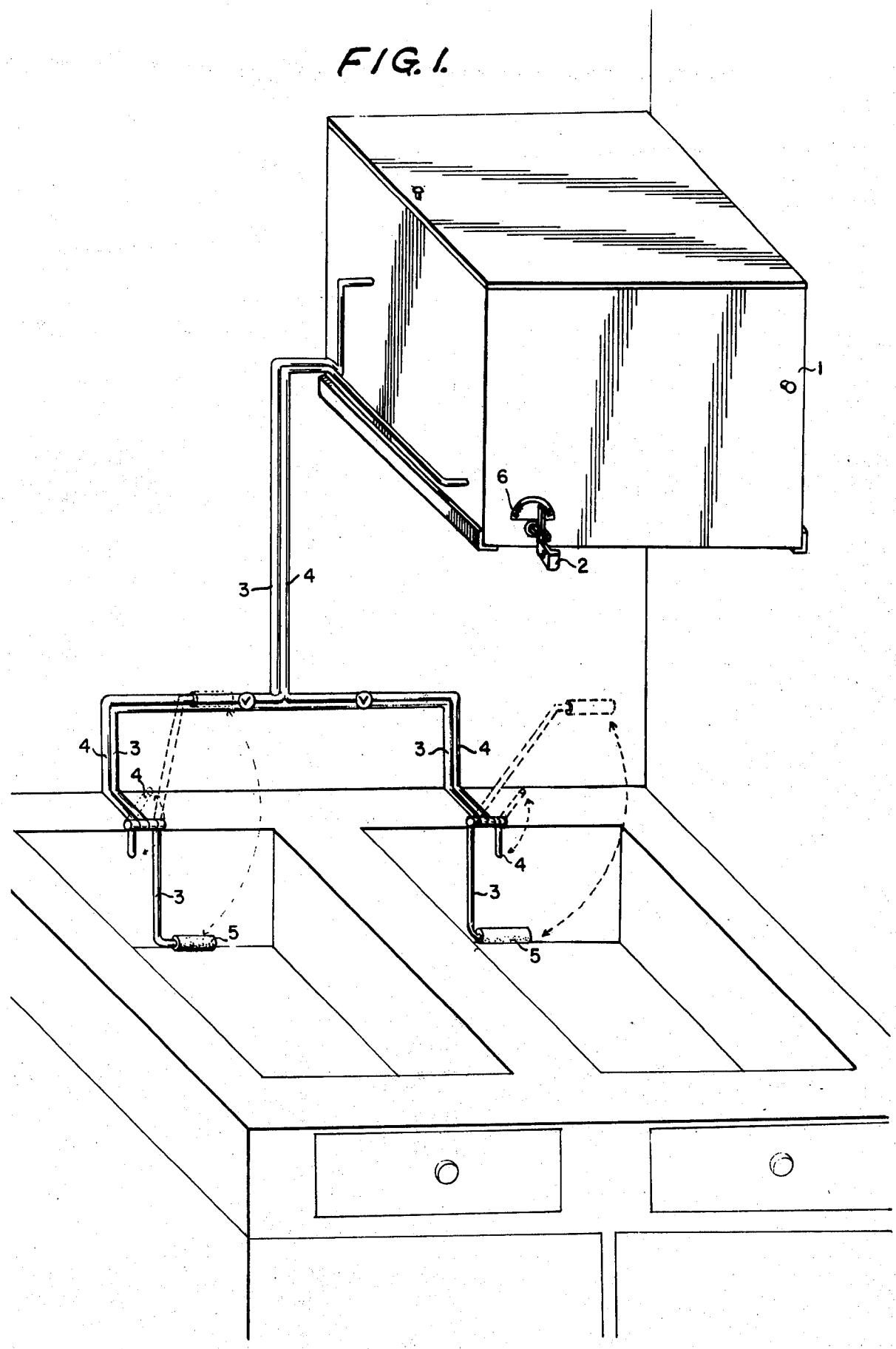
Figure 4A:
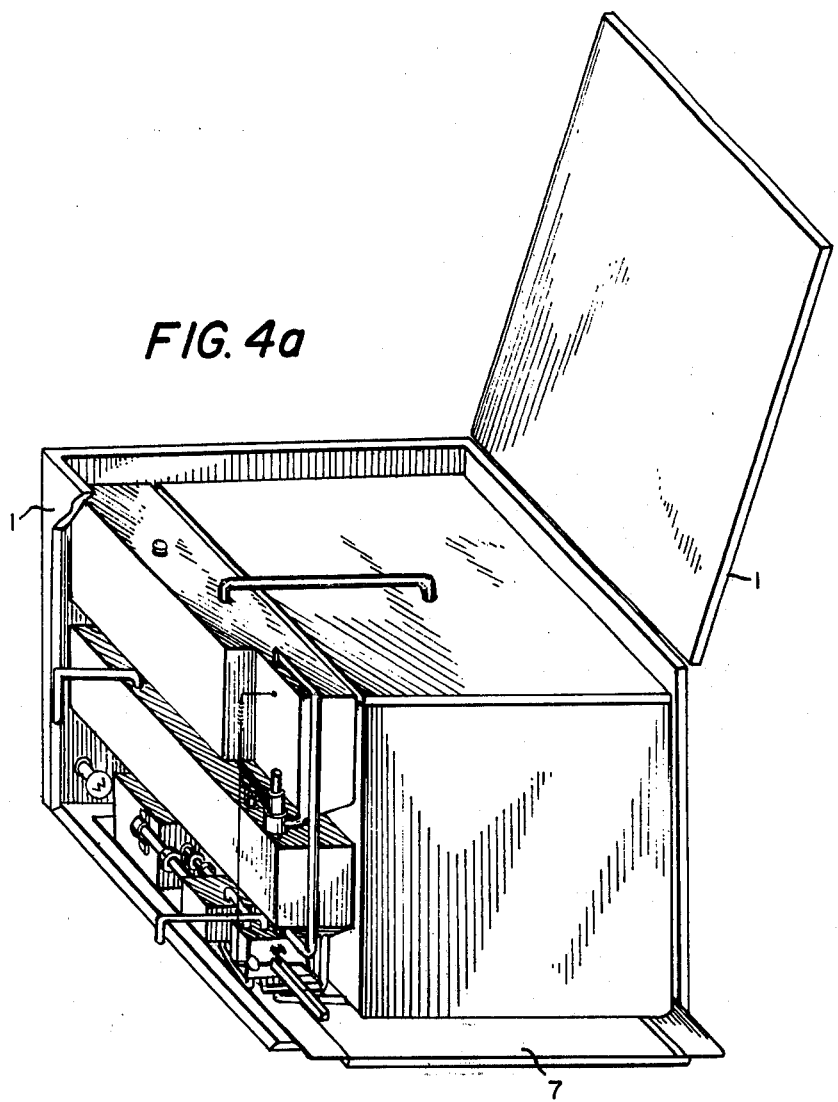
FIGS. 4a, 4b, 5 and 6 show the pumping and storage system.
Figure 4B:
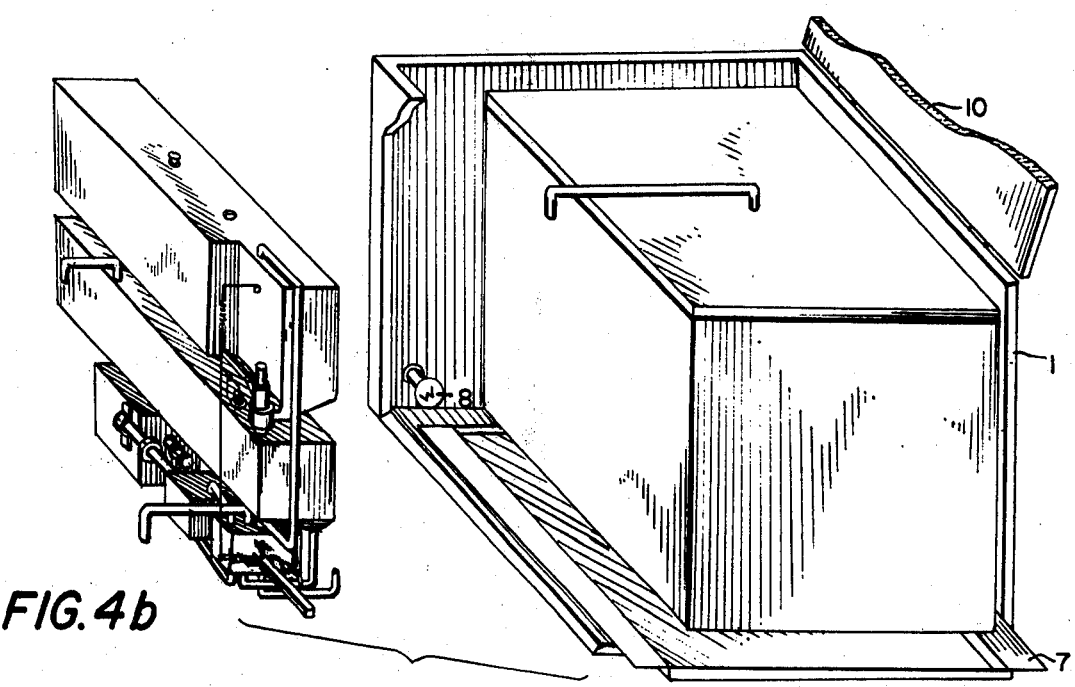
Figure 5:
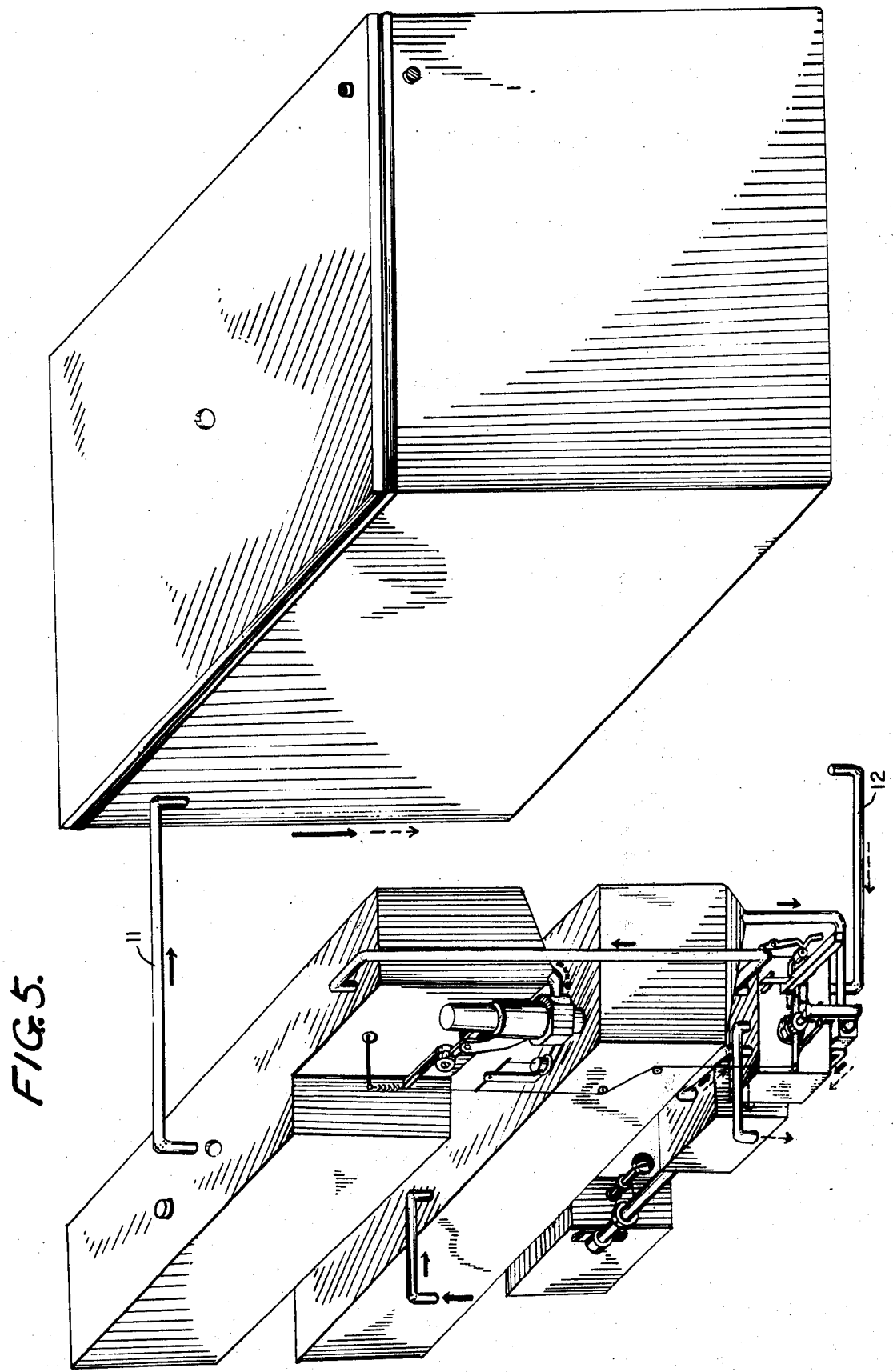

During the filling of the pressure fluid pump 100 by the reservoir tank 13, the motor has to wait for action until the pumping system is ready. That is to say that the reservoir tank 13 has to be emptied, the valves 16 and 22 have to be shut closed to prevent any possible air leaks into the pumping system which includes the volume enclosed in the intake pipe 3, the regulator tank 20, the pipe 25, 6-way-valve 29 and the pressure fluid pump 100. The amount of time the motor has to wait for the pumping system to get ready is determined by the time delay switch 64 or 74. For the very first time in operation, the reservoir tank 13 of the machine has to be primed with fluid through the hole 18. Subsequently the reservoir tank 13 is filled by pipe 19 during each filtration process. The filtration process is initiated by a single movement of the valve stem 45 in a clockwise direction until the dial turn key 2 points to the IN position on the dial 6. A number of things happen simultaneously:

i. The valves 36 and 38 of the 6-way-valve 29 are opened while the valves 35 and 37 are closed. Therefore, the intake path as indicated by the solid arrows of FIGS. 5 and 19 is selected.

ii. The roller 47 is forced downwards and passes across the hump of lever 48, momentarily causing its fixed end to bend to the left. This sudden bending of lever 48 is transmitted through the L lever 49 which jerks the connecting bar 50 of FIG. 9 forward. As a result, the time delay switch is set into motion to start timing.

iii. The double throw switch contact plate 51 of the valve stem 45 makes contact with the switch contact plate 41. Therefore the motor 99 is set into the waiting mode and is ready to run if the insulating plate 90 is withdrawn from between the switch contact plates 89 and 91 (please refer to circuit diagrams of FIG. 19).

iv. The staircase socket 53, 54, 55 of the lever system governing the opening and closing movement of the connecting valve 16 and the air valve 22 moves in a clockwise direction, carrying forward on its lower step 53 the right arm of the horizontal lever 59. The left arm of the horizontal lever 59 responds with a downward movement (anticlockwise) which exerts downward pull on the valve line 24. As a result, the connecting valve 16 and the air valve 22 are pulled open. Fluid in the reservoir tank 13 thus flows freely into and fills the regulator tank 20, the 6-way-valve 29 and the pressure fluid pump 100 under gravity. As the reservoir tank 13 is drained empty, the switch contact plates 67 and 69 of the clock type 64 or 77 and 78 of the air pump type 74 time delay switch touch. This action energizes the following coil magnets (please refer to the circuit diagrams of FIG. 19;

1. Coil magnet 57 pulls the tail of the lifting lever 56 downward towards it, thus lifting the right arm of the horizontal lever 59 clear out of the first step 53 level of the staircase socket and allowing the right arm to rest on the second stair 55 level. This action releases the right arm of the horizontal lever 59 to be able to move freely backward (clockwise) thus allowing the extension springs 17 and 23 of FIG. 6 to shut close the connecting valve 16 and the air valve 22.

2. Meanwhile, the coil magnet 93 of the centripetal switch assembly is also energized, causing the insulating plate 90 to be drawn out from between the switch contact plates 89 and 91. A direct contact between these switch plates is attained which enables the motor 99 to start running.

The motor 99 drives the pressure fluid pump 100 to draw fluid from the frying apparatus through the first stage filter 5 along pipe 3 into the regulator tank 20. Then along pipe 25 into the incoming chamber 32 of the 6-way-valve 29 and then along pipe 26 through the pressure fluid pump 100 into the outgoing chamber 31 and then out of the 6-way-valve 29 along pipe 19 into the reservoir tank 13. When the reservoir tank 13 is filled up, the excess fluid is forced to flow along pipe 11 into the storage tank 101 where the fluid is being processed and stored (please refer to the flow diagram of FIG. 19).

When the frying apparatus is emptied by the machine, the pressure in the pressure fluid pump 100 drops due to the absence of fluid. The motor 99 accelerates and causes the weights 94 of the centripetal disc assembly to be thrown out. This sudden increase in centripetal disc diameter depresses the broad end of the switch opening lever 87 which responds by separating the switch contact plates 89 and 91, thus turns off the motor 99 and the extension spring 92 drives the insulating plate 90 in between the switch contact plates 89 and 91.

At this point, all the dirty grease had been transferred from the frying apparatus into the machine where it has been filtered, processed and is stored in the storage tank 101 waiting for delivery. This concludes the IN cycle.

b. The OUT Cycle Operation

This cycle is for delivering the processed grease from the storage tank 101 of the machine back into the frying apparatus. Whenever the operator is ready for the processed filtrate, he simply turns the valve stem 45 of the 6-way-valve 29 in an anticlockwise direction until the dial key 2 points to the OUT position on the dial 6. The following actions are then simultaneously initiated:

i. The valves 35 and 37 are opened while the valves 36 and 38 of the 6-way-valve 29 are closed. Therefore, the pressure fluid pump 100 is filed by fluid from the filtering storage system right away and the exhaust or outflow path as indicated by the broken arrows of FIG. 5 and 19 is selected.

ii. The staircase socket moves backwards allowing the right arm of the horizontal lever 59 to slip from the upper step 55 level back onto the lower step 53 level by the action of the compression spring 62 of the valve opening lever system (56–63) of FIG. 8.

iii. The double throw switch contact plate 51 of the valve stem 45 makes contact with the switch contact plate 42 on the 6-way valve 29. As a result, the coil magnet 93 is energized (this time, the circuit for energizing the coil magnet 93 does not go through the time delay switch but goes directly to the coil magnet 93 and the insulating plate 90 is again withdrawn from between the switch contact plates 89 and 91. Thus, the motor 99 starts to run right away without waiting. (Please refer to the circuit diagram for the OVERHEAD HANGING type in FIG. 19.) The pressure fluid pump 100 starts to draw fluid from the storage tank 101 out along pipe 12 and through the 6-way-valve 29 into the frying apparatus. When the fluid in the storage tank 101 is completely delivered back to the frying apparatus, the motor 99 again picks up speed causing itself to be shut off by the same mechanism mentioned earlier for the IN cycle operation. At this point, the entire filtration process is completed.

B. The Ground Type

Since the machine of this type is simpler, as can be seen in FIGS. 18 and 19, the filtration process performed by the machine is also simpler. However, the two independent steps of operation to initiate the machine to do the filtration procedures remain the same.

a. The IN Cycle Operation:

The valve turn key 2 is turned clockwise to the IN position on the dial 6, the following actions are triggered:

i. The valves 36 and 38 are opened and the valves 35 and 37 are closed. Therefore, the fluid will flow along the intake path from the frying apparatus into the pump under gravity as indicated by solid arrows in FIG. 19.

ii. The double throw switch contact plates 51 and 41 make contact, thus energizing the coil magnet 93 to pull the insulating plate 90 out from between the switch contact plates 89 and 91. Therefore, the motor 99 runs right away and drives the pressure fluid pump 100 to draw fluid directly from the frying apparatus through the 6-way-valve 29 into the filtering storage tank system to be processed and stored. After the fluid in the frying apparatus is completely transferred to the machine, the motor stops again by the same mechanism.

b. The OUT Cycle Operation

The valve turn key 2 is turned anticlockwise to the OUT position on the dial, the exhaust or outflow path as indicated by the broken arrows in FIG. 19 is selected, and the double throw switch contact plates 51 and 42 touch which enable the insulating plate 90 to be pulled out from between the switch contact plates 89 and 91 by the coil magnet 93. Thus, the motor 99 starts to drive the pressure fluid pump 100 to draw fluid from the storage tank 101 through the 6-way-valve 29 back into the frying apparatus. After the storage tank 101 is emptied of fluid, the motor 99 stops and the entire filtration process performed by the GROUND type is thus completed.

It will be noted by those skilled in the particular art that the herewith described device could be constructed in various forms and sizes and still remain within the essence of the basic concept.

Having illustrated and described a preferred embodiment as well as variants of this invention, it will be obvious to those skilled in the art that further changes and modifications may become apparent. Such changes and modifications are not to affect this instant concept and are to be considered within the scope and essence of this invention.

I claim:

1. A fluid filtering device for filtering fluid type oil or the like in a container comprising:
   a filter tank for receiving oil to be filtered,
   pump means for pumping oil from the container to said filter tank,
   reservoir means for priming said pump means,
   said pump means having first and second valve means,
   said first valve means being operable to channel oil through said pump means to the reservoir means and through said reservoir means to said filter tank,
   said second valve means being operable to pass oil from said filter tank to the container,
   means in the filter tank for filtering the oil passing therethrough,
   a second tank positioned above said pump means,
   a first oil line passing from the container to said second tank and a second oil line passing from said second tank to said first and second valve means,
   said reservoir means comprising a reservoir tank positioned above said second tank means,
   a third oil line passing from said reservoir tank to said second tank,
   a fourth oil line passing from the first and second valve means to said reservoir tank,
   a fifth oil line passing from the reservoir tank to the filter tank,
   said first and second valve means being operable to pass fluid from said second tank to said reservoir tank and from said reservoir tank to said filter tank,
   said pump means pumping fluid from said second tank and container through said reservoir tank to said filter tank,
   said fourth and fifth lines being connected to the upper portion of said reservoir tank, wherein said reservoir tank is filled before oil passes through said fifth line to said filter tank,
   and third valve means in said third line between said reservoir tank and said second tank that is selectively openable to pass reservoir oil from said reservoir tank to said second tank and through said second tank to said valve means and pump means providing priming oil to said pump means.

2. The fluid filtering device as claimed in claim 1 including,
   timing means for opening and closing said third valve means and for energizing said pump, a given time period following opening said third valve means,
   and said given time period being that time required to prime said pump means.

3. The fluid filtering device as claimed in claim 1 wherein,
   the collective volume of said second tank and reservoir tank being substantially equal to the volume of the first line from the container to said second tank.

4. The fluid filtering device as claimed in claim 1 wherein,
   said filter tank having a volume substantially larger than the container,
   and control means responsive to said pump means pumping all the fluid out of the container for de-energizing said pump means and changing said valve means from the first valve means to the second valve means wherein the oil flows from said filter tank through the second valve means to the container after being filtered in said filter tank.

5. A fluid filtering device for filtering fluid type oil or the like in a container comprising:
   a filter tank for receiving oil to be filtered,
   pump means for pumping oil from the container to said filter tank,
   reservoir means for priming said pump means,
   said pump means having first and second valve means,
   said first valve means being operable to channel oil through said pump means to the reservoir means and through said reservoir means to said filter tank,
   said second valve means being operable to pass oil from said filter tank to the container, means in the filter tank for filtering the oil passing therethrough,
a second tank positioned above said pump means,
a first oil line passing from the container to said second tank and a second oil line passing from said second tank to said first and second valve means,
said reservoir means comprising a reservoir tank positioned above said second tank means,
a third oil line passing from said reservoir tank to said second tank,
a fourth oil line passing from the first and second valve means to said reservoir tank,
a fifth oil line passing from the reservoir tank to the filter tank,
said first and second valve means being operable to pass fluid from said second tank to said reservoir tank and from said reservoir tank to said filter tank,
and said pump means pumping fluid from said second tank and container through said reservoir tank to said filter tank.

* * * * *